United States Patent
Heim et al.

(10) Patent No.: US 8,528,075 B2
(45) Date of Patent: Sep. 3, 2013

(54) ACCELERATING THE EXECUTION OF ANTI-VIRUS PROGRAMS IN A VIRTUAL MACHINE ENVIRONMENT

(75) Inventors: Itamar Heim, Tel Aviv (IL); Shahar Frank, Ramat Hasharon (IL)

(73) Assignee: Red Hat Israel, Ltd., Raanana (IL)

( * ) Notice: Subject to any disclaimer, the term of this patent is extended or adjusted under 35 U.S.C. 154(b) by 614 days.

(21) Appl. No.: 12/325,230

(22) Filed: Nov. 30, 2008

(65) Prior Publication Data

US 2010/0138924 A1 Jun. 3, 2010

(51) Int. Cl.
*G06F 12/00* (2006.01)
*G06F 11/00* (2006.01)
*G06F 11/30* (2006.01)
*G06F 9/44* (2006.01)

(52) U.S. Cl.
USPC .......... 726/21; 726/24; 726/25; 713/187; 717/124

(58) Field of Classification Search
USPC ............ 713/187–188, 193–194; 726/21–25
See application file for complete search history.

(56) References Cited

U.S. PATENT DOCUMENTS

| | | | | |
|---|---|---|---|---|
| 6,021,510 A | * | 2/2000 | Nachenberg | 714/38.14 |
| 7,984,304 B1 | * | 7/2011 | Waldspurger et al. | 713/187 |
| 2007/0038677 A1 | * | 2/2007 | Reasor et al. | 707/200 |
| 2009/0158432 A1 | * | 6/2009 | Zheng et al. | 726/24 |

OTHER PUBLICATIONS

Qumranet, Inc., "KVM—Kernel-based Virtualiztion[sic] Machine", White paper, copyright 2006 Qumranet Inc., pp. 1-5.
Qumranet, Inc., "Solid ICE™ Overview," Apr. 2008, copyright 2008 Qumranet, Inc., pp. 1-15.
Qumranet, Solid ICE™, Connection Broker, Apr. 2008, 7 pages.
Qumranet, KVM—Kernel-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Desktop Server (VDS), Apr. 2008, 6 pages.

* cited by examiner

*Primary Examiner* — Evans Desrosiers
(74) *Attorney, Agent, or Firm* — Lowenstein Sandler LLP (57) ABSTRACT

The execution of anti-virus programs can be accelerated in a virtual desktop environment. In one embodiment, a server hosts a plurality of virtual machines. Before performing a virus scan on a file, the server computes a signature value of the file, compares the signature value with the stored signature values in a central database, and performs virus scan on the file according to the result of the comparison. If the signature value exists in the central database, the virus scan on the file can be skipped.

19 Claims, 5 Drawing Sheets

ACCELERATING THE EXECUTION OF ANTI-VIRUS PROGRAMS IN A VIRTUAL MACHINE ENVIRONMENT

TECHNICAL FIELD

Embodiments of the present invention relate to virtual machines, and more specifically, to virus scans in a virtual machine environment.

BACKGROUND

Virtualization allows multiplexing of an underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor, or a host operating system. The hypervisor emulates the underlying hardware of the host computer, making the use of the virtual machine transparent to the guest operating system and the user of the computer.

Virtual machines can be provided by a centralized host that is coupled to multiple clients over a network. Each virtual machine provides a virtual desktop for the client and executes the graphics operations relating to the virtual desktop. The guest operating system of a virtual machine manages the files used by the virtual machine. In a conventional virtual machine system, each virtual machine periodically runs an anti-virus program to ensure that the files are not corrupted by a virus. However, the anti-virus programs typically incur a significant amount of random I/O, which slows down the entire system. Further, some of virtual machines may run the anti-virus programs at the same time and create a sudden increase in the system load. Therefore, running the anti-virus programs in a conventional virtual machine system can degrade system performance, increase disk I/O, and consume significant CPU cycles.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for accelerating the execution of anti-virus programs in a virtual machine environment. In one embodiment, a server hosts a plurality of virtual machines. Before performing a virus scan on a file, the server computes a signature value of the file, compares the signature value with the stored signature values in a central database, and performs a virus scan on the file according to the result of the comparison. If the signature value exists in the central database, the virus scan on the file can be skipped.

The techniques described herein reduce the number of files to be scanned for virus. As a result, anti-virus operation can be accelerated. As multiple virtual machines may use the same files, multiple copies of the same files can exist in the system. If one copy of the file has been scanned by one virtual machine, it is not necessary to scan another copy of the same file. The system described herein can identify copies of the same file by using the signature values computed from the file content. Files with the same signature value will be scanned once until the file is modified. In a scenario where one copy of the file is corrupted by virus but another copy is not corrupted, the signature values of the two copies will be different. Therefore, both copies will be scanned for virus and the corrupted copy can be repaired.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "computing", "performing", "refraining", "receiving", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
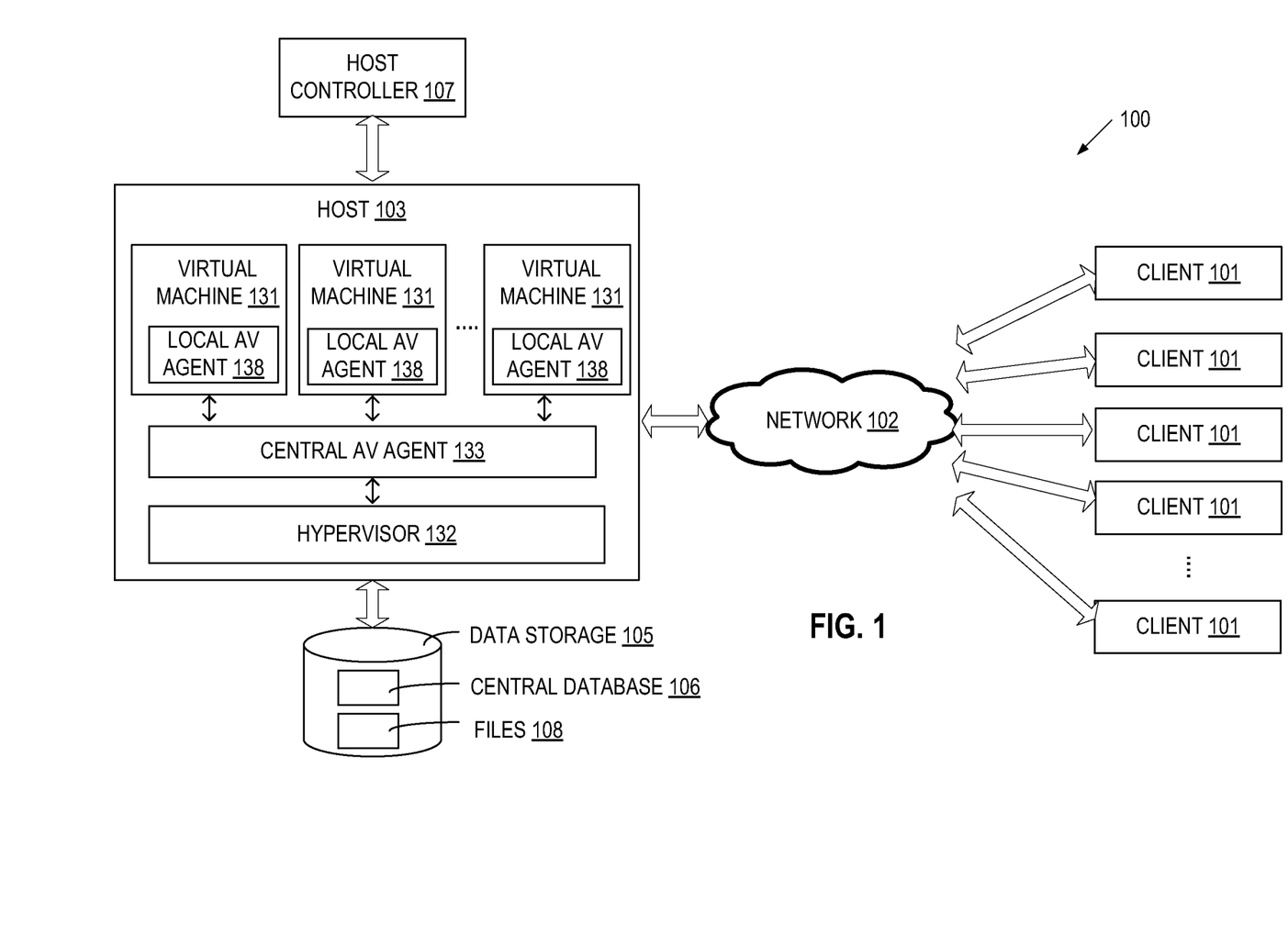
FIG. 1 illustrates an exemplary network architecture in which embodiments of the present invention may operate.

FIG. 1 illustrates an exemplary network architecture 100 in which embodiments of the present invention may operate. The network architecture 100 includes a host 103 coupled to one or more clients 101 over a network 102. The network 102 may be a private network (e.g., a local area network (LAN), wide area network (WAN), intranet, etc.) or a public network (e.g., the Internet). The host 103 is also coupled to a data storage 105. In addition, the host 103 may be coupled to a host controller 107 (via a network or directly). Alternatively, the host controller 107 may be part of the host 103.

In one embodiment, the clients 101 may include computing devices that have a wide range of capabilities. Some of the clients 101 may be thin clients, which serve as access terminals for users and depend primarily on the host 103 for processing activities. A thin client has limited processing and memory capacities. For example, a thin client may a laptop computer, cellular phone, personal digital assistant (PDA), a re-purposed desktop computer, etc. Some of the clients 101 may be thick (fat) clients, which have graphics processors, powerful CPUs and large memory. For example, a thick client may be a dual-core or multi-core computer, workstation, graphics workstation, etc. Some of the clients 101 may be configured, e.g., by a system administrator, to a capacity configuration setting that is different from their actual capacities. For example, a thick client may be configured to be used as a thin client. The client 101 may run client applications such as a Web browser and a graphic user interface (GUI). The client 101 may also run other client applications, which receive multimedia data streams or other data from the host 103 and re-direct the received data to a local display or other user interface.

In one embodiment, the host 103 includes a server or a cluster of servers to host one or more virtual machines 131. Each virtual machine 131 runs a guest operating system (OS) that may be different from one another. The guest OS may include Microsoft Windows, Linux, Solaris, Mac OS, etc. The host 103 may include a hypervisor 132 that emulates the underlying hardware platform for the virtual machines 131. The hypervisor 132 may also be known as a virtual machine monitor (VMM), a kernel-based hypervisor or a host operating system.

Each virtual machine 131 can be accessed by one or more of the clients 101 over the network 102. Each virtual machine 131 executes operations for a client. In one scenario, each virtual machine 131 provides a virtual desktop for the client 101 and executes some or all of the graphics operations relating to the virtual desktop. From the user's point of view, the virtual desktop functions as a physical desktop (e.g., a personal computer) and is indistinguishable from a physical desktop.

In one embodiment, the virtual machines 131 can be managed by the host controller 107. The host controller 107 may also add a virtual machine, delete a virtual machine, balance the load on the server cluster, provide directory service to the virtual machines 131, and perform other management functions.

According to one embodiment of the present invention, the host 103 includes a central agent 133 and local agents 130 for performing anti-virus operations. The central agent 133 is a host-side application. Alternatively, the central agent 133 may run on a special virtual machine on the host 103. In yet another embodiment, the central agent 133 may run on a separate server (not shown), which is coupled to the host 103 over a network. Each of the local agents 138 runs on one of the virtual machines 131. The central agent 133 and the local agents 138 perform anti-virus operations on files 108 stored in the data storage 105. The files 108 are managed by the guest operating systems of the virtual machines 131.

The data storage 105 may also contain a central database 106 that stores virus scan information of the files 108. In an alternative embodiment, the central database 106 may be stored in an internal memory of the host 103, a local storage location, a remote storage location, or other storage location. The central agent 133 and the local agents 138 will be described in greater detail with reference to FIGS. 2-4.

Figure 2:
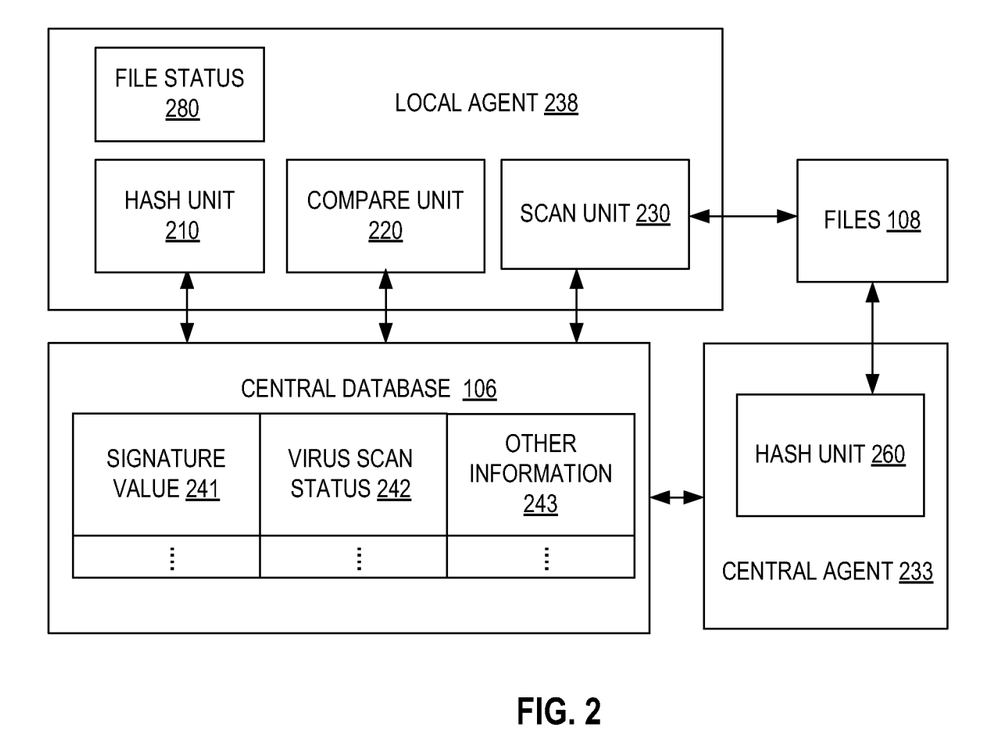
FIG. 2 is a block diagram illustrating one embodiment of a central agent and a local agent for performing anti-virus operations.

FIG. 2 illustrates an embodiment of a central agent 233 and a local agent 238, which may be the central agent 133 and one of the local agents 138 of FIG. 1. Although one local agent 238 is shown, it is understood that the host 103 can support any number of the local agents 238.

In this embodiment, the central agent 233 maintains the central database 106. The central database 106 includes a data structure (e.g., a table), which contains a signature value 241, a virus scan status 242, and other information 243 (e.g., a file identifier that identifies the location of the file) for each of the files 108. In this embodiment, the central agent 233 includes a hash unit 260 that computes a signature value (e.g., a hash value) of each of the files 108 using a hash function. The hash function can be a general-purpose hash function (e.g., checksums), special-purpose hash function, cryptographic hash function, or other known hash function. The hash unit 210 of the local agent 238 receives the data in a file as input and produces a signature value for the file. In one embodiment, the hash unit 210 uses the entire content of the file to compute the signature value of the file. As a virus may attack random portions of a file, a corrupted file may be undetected if only a portion of the file is used to compute the signature value. Each signature value can be a fixed-length or variable-length value, which serves as an identifier of the content of the corresponding file. A signature value can be any identifier that uniquely (or within a given high probability) identifies the content of a file. If two files have the same signature values, the two files will have the same content (or the same content within a given high probability). Thus, the signature values can be used to identify files of identical contents.

After the signature values of the files 108 are computed, the central agent 233 stores the signature values 241 in the central database 106 and resets the virus scan status 242. Additional information, such as file locators or file handles, can also be stored in the central database 106.

In one embodiment, the central agent 233 can perform an initial virus scan for all of the files 108, or the files 108 that have non-duplicate contents. The central agent 233 can then set the corresponding virus scan status 242 for these files in the central database 106. Alternatively, an initial virus scan is unnecessary. In the alternative embodiment, the local agents 238 perform virus scan, periodically or on command, and update the central database 106 after the virus scan.

In the embodiment of FIG. 2, the local agent 238 includes a hash unit 210, a compare unit 220 and a scan unit 230. The hash unit 210 in the local agent 238 performs the same function as the hash unit 260 in the central agent 233. When the local agent 238 identifies a file to scan, the hash unit 210 computes the signature value for the file. The compare unit 220 compares the signature value of the file with those signature values 241 in the central database 106 to identify files of the same contents. If the signature value of the file exists in the central database 106, the local agent 238 may skip (that is, refrain from performing) the virus scan for the file. Otherwise, the scan unit 230 of the local agent 238 runs an anti-virus program to scan the file. If there is no virus in the file, the local agent 238 updates the central database 106 to record the signature value 241 of the file and set the virus scan status 242 for the file. It the file is corrupted, the local agent 238 repairs the file, computes the signature value of the repaired file, and updates the central database 106.

In this embodiment, the central database 106 is stored in a location that is directly accessible to all of the local agents 238 on the host. The storage location can be internal to the host, local to the host, or remote to the host. In an alternative embodiment, the local agents 238 may access the central database 106 through a host-side application, such as the central agent 233.

In the embodiment of FIG. 2, the local agent 238 also maintains a file status 280 in memory for the files that are managed by the corresponding virtual machine guest operating system. The file status 280 indicates whether a file has been modified since the last virus scan. If a file has been checked for virus and has not been updated since the virus scan, the local agent 238 may determine that the file has not been attacked by a virus and a virus scan is unnecessary at this point. If a file has been modified since the last virus scan, the file may have been modified by a user or by virus. Thus, a virus scan is necessary in this situation. By maintaining the file status 280, the number of files that need to be scanned by the local agent 238 can be reduced.

Figure 3:
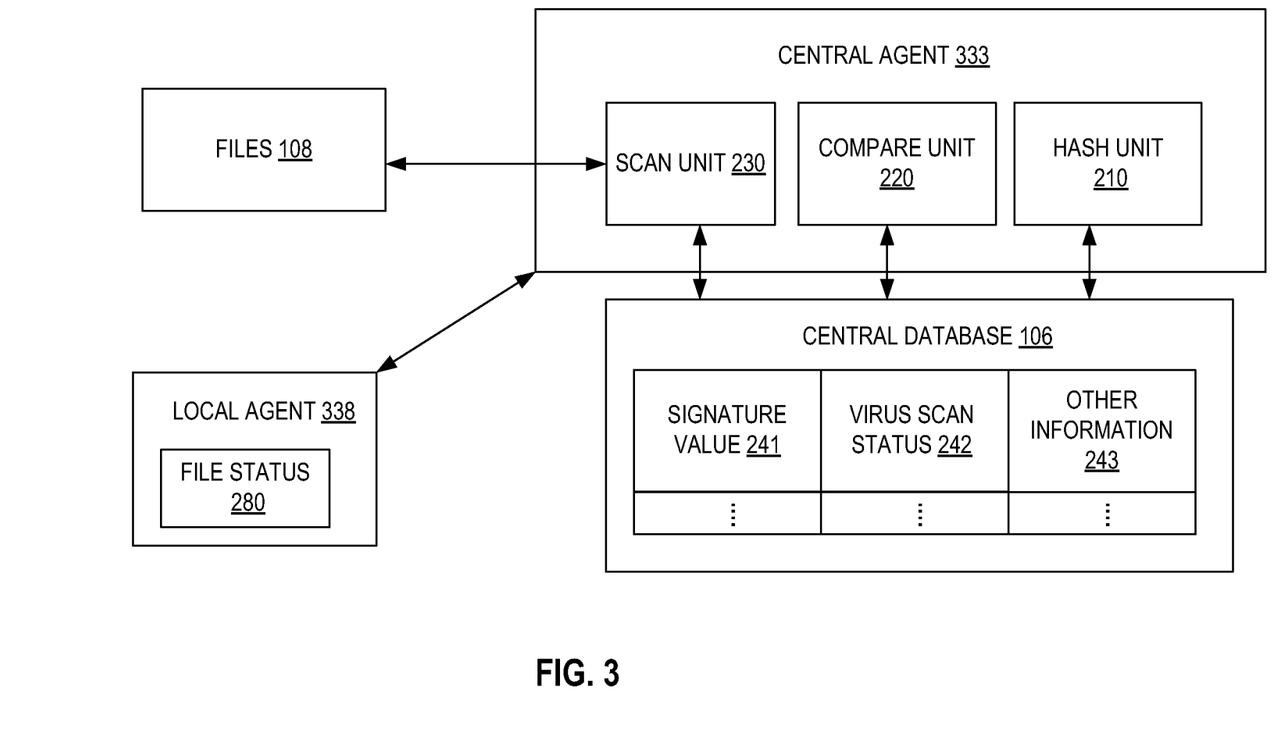
FIG. 3 is a block diagram illustrating another embodiment of a central agent and a local agent for performing anti-virus operations.

FIG. 3 illustrates another embodiment of a central agent 333 and a local agent 338, which may be the central agent 133 and one of the local agents 138 of FIG. 1. Although one local agent 338 is shown, it is understood that the host 103 can support any number of the local agents 338.

In this embodiment, the virus scan is performed by the central agent 333 instead of the local agent 338. The hash unit 210, the compare unit 220 and the scan unit 230, which reside in the local agent 238 of FIG. 2, are located in the central agent 333. Similar to the embodiment of FIG. 2, initially, the central agent 333 computes the signature values 241 stored in the central database 106 and resets the virus scan status 242. Additional information, such as file locators or file handles, can also be stored in the central database 106. The central agent 233 can also perform an initial virus scan for all of the files 108, or the files 108 that have non-duplicate contents. The central agent 233 can then set the corresponding virus scan status 242 for these files in the central database 106. In this embodiment, the local agent 338 does not have direct access to the central database 106 and do not perform virus scans. Instead, the local agent 338 requests the central agent 333 to perform the virus scans. This embodiment shifts the load from the local agent 338 to the central agent 333. This load shifting may be appropriate when the virtual machine 133 on which the local agent 338 operates is overloaded. In some scenarios, shifting the load to the central agent 333 improves the virus scan performance as the central agent 333 may have much more resources and better storage connection then the local agent 338. For example, in an embodiment where the central agent 333 resides on a server separate from the server (e.g., the host 103) on which the local agent 338 resides, the server running the central agent 333 may be more powerful than the local agent 338. In this example, shifting the load to the central agent 333 improves the virus scan performance.

In this embodiment, periodically or on command, the local agent 338 determines the files to be scanned for virus. The files may be determined from the file status 280, which identifies the files that have been modified since the last virus scan. The local agent 338 then submits an identifier of one of the files (e.g., a file locator or a file handle) to the central agent 333. The central agent 333 uses the identifier to retrieve the file from the data storage 105. The hash unit 210 computes the signature value of the file, and the compare unit 220 compares the signature value of the file with those signature values 241 in the central database 106 to identify files of the same contents. If the signature value of the file exists in the central database 106, the central agent 333 may skip (that is, refrain from performing) the virus scan for the file. Otherwise, the scan unit 230 of the central agent 333 runs an anti-virus program to scan the file. If there is no virus in the file, the central agent 333 updates the central database 106 to record the signature value 241 of the file and set the virus scan status 242 for the file. It the file is corrupted, the central agent 333 repairs the file, computes the signature value of the repaired file, and updates the central database 106. The central agent 333 then informs the local agent 338 whether the file has passed the virus scan, has been repaired, or cannot be repaired.

In an alternative embodiment, the local agent 338 may calculate the signature value for the file to be scanned, and submit the signature value to the central agent 333 to check its virus scan status. In this alternative embodiment, the computation of the signature value for the file is shifted back from the central agent 333 to the local agent 338.

In yet another embodiment, the configurations shown in FIGS. 2 and 3 can be combined. Referring again to FIG. 1, in a mixed-deployment environment, some of the local agents 138 on the host 103 can be the local agent 238 (FIG. 2) and some of the local agents 138 can be the local agent 338 (FIG. 3). The central agent 133 in the mixed-deployment environment can be the central agent 333, which is capable of supporting both the powerful local agent 238 and the lean local agent 338.

Figure 4:
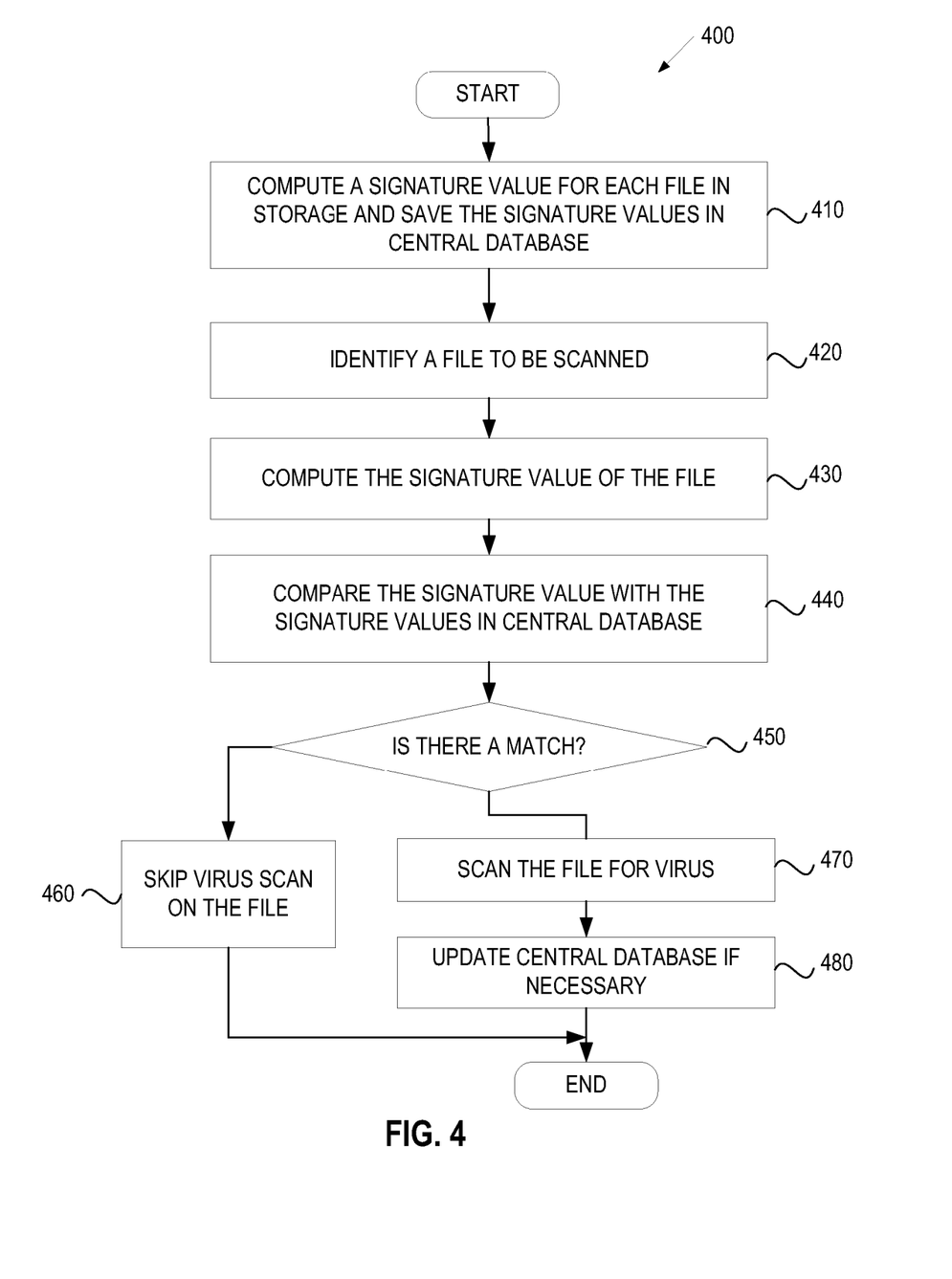
FIG. 4 is a flow diagram illustrating a method for performing anti-virus operations in accordance with one embodiment of the present invention.

FIG. 4 is a flow diagram illustrating one embodiment of a method 400 for performing virus scan on the system 100 of FIG. 1. The method 400 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the central agent 133 and the local agents 138 (FIG. 1).

Referring to FIG. 4, in one embodiment, the method 400 begins with the central agent 133 computing a signature value for each of the files 108 (block 410). The signature values are saved in a data structure in the central database 106. The local agent 138 then identifies a file to be scanned for virus (block 420). Depending on the configuration of the local agent 138 and the central agent 133, either the local agent 138 or the central agent 133 computes a signature value for the file to be scanned (block 430). The signature value of the file is compared with the signature values in the central database 106 (block 440). If there is a match in the signature values (block 450), no virus scan is performed for that file (block 460). If there is not a match (block 450), the file is scanned for virus by either the local agent 138 or the central agent 133 (block 470). The central database 106 is then updated to reflect the result of the virus scan (block 480). For example, an entry representing a file that is not currently in the central database 106 can be added, the virus scan status of a file can be set, etc.

Figure 5:
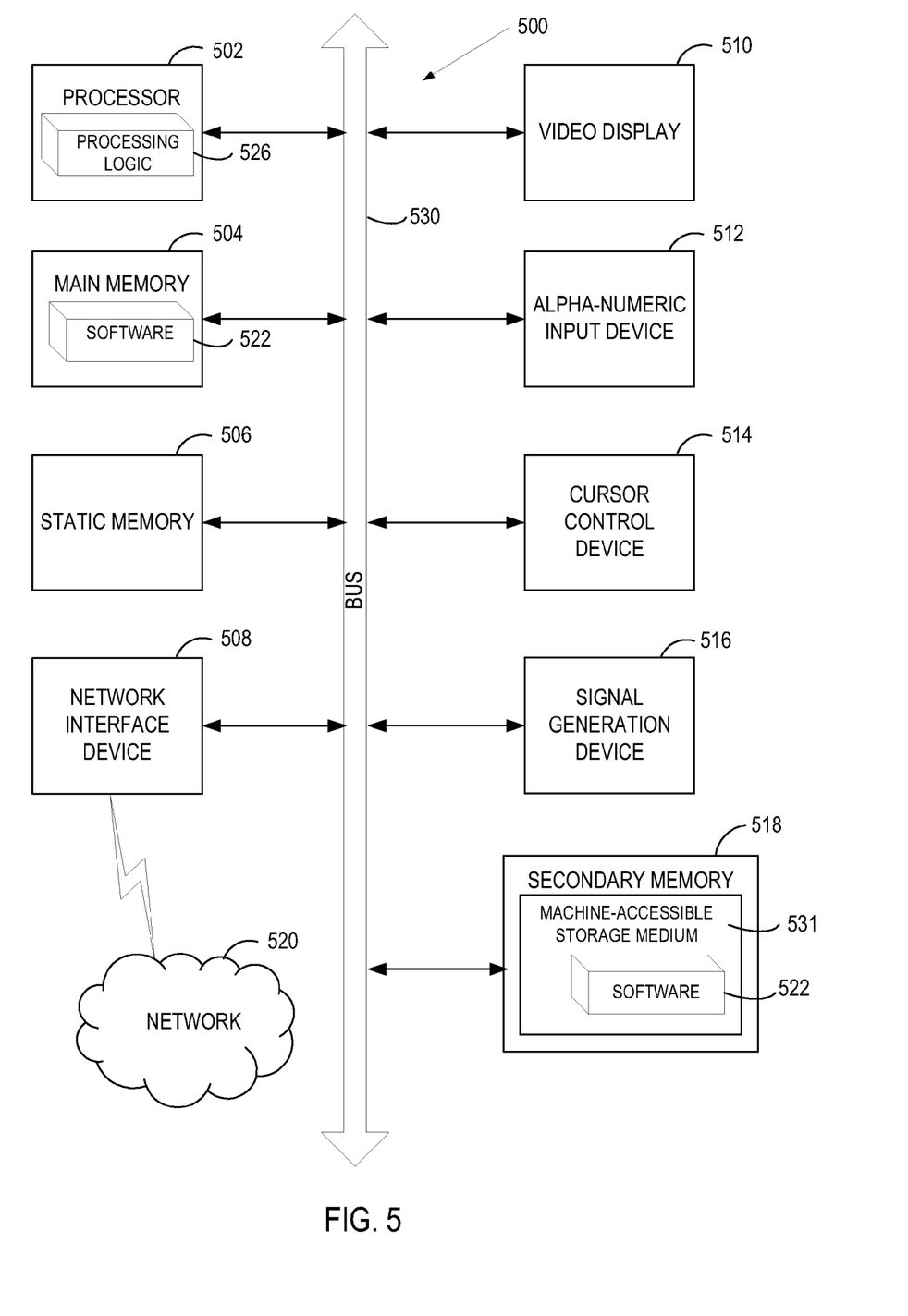
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the central agent 133 and the local agents 138 (FIG. 1). While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
  computing a signature value of a file managed by a guest operating system of a virtual machine, the virtual machine hosted by a server that supports a plurality of virtual machines having a plurality of guest operating systems;
  before computing the signature value, determining whether the file has been modified since a previous harmful code scan;
  determining, by the server, whether the signature value of the file managed by the guest operating system exists in a central database, wherein the central database includes signatures of files previously scanned by the plurality of guest operating systems; and
  refraining from performing a harmful code scan on the file in response to a determination that the signature value of the file managed by the guest operating system exists in the central database, or performing the harmful code scan on the file in response to a determination that the signature value does not exist in the central database.

2. The method of claim 1, wherein determining whether the signature value exists in a central database further comprises:
  determining whether the file has identical contents of another file.

3. The method of claim 1, wherein the central database is accessible by the plurality of virtual machines.

4. The method of claim 1, further comprising:
  receiving, at a central agent of the server, an indication from a local agent of the virtual machine to scan the file;
  looking up the central database, and
  sending a harmful code scan status to the local agent.

5. The method of claim 1, wherein the plurality of virtual machines includes first local agents that perform anti-virus operations and second local agents that request a central agent on the server to perform anti-virus operations.

6. The method of claim 1, wherein the harmful code scan comprises a virus scan.

7. A system comprising:
  a data storage to store a plurality of files, the files managed by a plurality of guest operating systems that operate on a plurality of virtual machines;
  a central database to store signature values; and
  a server comprising a processor coupled with a memory, the server coupled to the data storage and the central database to host the virtual machines, the server to compute a signature value of a file managed by the guest operating system and to be scanned for harmful code and before computing the signature value, determine whether the file has been modified since a previous harmful code scan, the server to perform harmful code scan on the file managed by the guest operating system according to a determination of whether the signature value exists in the central database, wherein the central database includes signatures of files previously scanned by the plurality of guest operating system, the server to refrain from performing the harmful code scan on the file in response to determination that the signature value of the file managed by the guest operating system exists in the central database, or perform the harmful code scan on the file in response to determination that the signature value does not exist in the central database.

8. The system of claim 7, wherein each of the virtual machines includes a local agent, at least one of the client agents to submit an indication to a central agent that runs on the server and to receive a harmful code scan status of the file from the central agent.

9. The system of claim 7, wherein each of the virtual machines includes a local agent, at least one of the local agents to scan the file for harmful code according to the determination.

10. The system of claim 7, wherein the server hosts a central agent outside the virtual machines, the central agent to scan the file for harmful code according to the determination.

11. The system of claim 7, wherein a first number of the virtual machines include first local agents that perform anti-virus operations and a second number of the virtual machines include second local agents that request a central agent on the server to perform anti-virus operations.

12. The system of claim 7, further comprising:
  a memory to store file status, which identifies the files that have been modified since a last harmful code scan.

13. The system of claim 7, wherein the harmful code scan comprises a virus scan.

14. A non-transitory computer readable storage medium including instructions that, when executed by a processing system, cause the processing system to perform operations comprising:
  computing a signature value of a file managed by a guest operating system of a virtual machine, the virtual machine hosted by a server that supports a plurality of virtual machines having a plurality of guest operating systems;
  before computing the signature value, determining whether the file has been modified since a previous harmful code scan;
  determining whether the signature value of the file managed by the guest operating system exists in a central database, wherein the central database includes signatures of files previously scanned by the plurality of guest operating systems; and
  refraining from performing a harmful code scan on the file in response to a determination that the signature value of the file managed by the guest operating system exists in the central database, or performing the harmful code scan on the file in response to a determination that the signature value does not exist in the central database.

15. The computer readable storage medium of claim 14, wherein determining whether the signature value exists in a central database further comprises:
  determining whether the file has identical contents of another file.

16. The computer readable storage medium of claim 14, wherein the central database is accessible by the plurality of virtual machines.

17. The computer readable storage medium of claim 14, wherein the operations further comprise:
  receiving, at a central agent of the server, an indication from a local agent of the virtual machine to scan the file;
  looking up the central database, and
  sending a harmful code scan status to the local agent.

18. The computer readable storage medium of claim 14, wherein the plurality of virtual machines includes first local agents that perform anti-virus operations and second local agents that request a central agent on the server to perform anti-virus operations.

19. The computer readable storage medium of claim 14, wherein the harmful code scan comprises a virus scan.

* * * * *